United States Patent
Mihara

(10) Patent No.: US 8,526,050 B2
(45) Date of Patent: Sep. 3, 2013

(54) DATA PROCESSING DEVICE, METHOD, STORAGE MEDIUM STORING PROGRAM THEREFOR, AND SIGNAL FOR DISCHARGING LIQUID DROPLETS, AND LIQUID DROPLET DISCHARGING DEVICE

(75) Inventor: Akira Mihara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1172 days.

(21) Appl. No.: 11/705,976

(22) Filed: Feb. 14, 2007

(65) Prior Publication Data

US 2008/0036801 A1    Feb. 14, 2008

(30) Foreign Application Priority Data

Aug. 9, 2006    (JP) .................................. 2006-216573

(51) Int. Cl.
*B41J 29/38* (2006.01)

(52) U.S. Cl.
USPC ................ 358/1.16; 347/13; 347/12; 347/42; 347/55; 347/19

(58) Field of Classification Search
USPC ................. 358/1.1, 1.13, 1.14, 1.15, 1.3–1.4, 358/1.7–1.8, 3.23, 1.16–1.17; 347/1, 5, 9, 347/12, 13, 20, 47, 40–44, 57
See application file for complete search history.

(56) References Cited

U.S. PATENT DOCUMENTS

| | | | | |
|---|---|---|---|---|
| 5,742,305 A * | 4/1998 | Hackleman | ..................... | 347/42 |
| 6,226,101 B1 * | 5/2001 | Sato | ................ | 358/1.8 |
| 6,270,180 B1 | 8/2001 | Arakawa et al. | | |
| 6,435,656 B2 * | 8/2002 | Fujioka | ............................ | 347/43 |
| 6,478,396 B1 * | 11/2002 | Schloeman et al. | ............ | 347/12 |
| 6,491,379 B1 * | 12/2002 | Kawaguchi et al. | ............ | 347/55 |
| 6,609,845 B1 | 8/2003 | Ninomiya | | |
| 6,932,453 B2 * | 8/2005 | Feinn et al. | ..................... | 347/12 |
| 7,008,040 B2 * | 3/2006 | Nakajima | ........................ | 347/41 |
| 7,092,115 B1 * | 8/2006 | Nakata | ......................... | 358/1.16 |
| 7,334,869 B2 * | 2/2008 | Mizuno | ............................ | 347/43 |
| 7,344,225 B2 * | 3/2008 | Nakajo | ............................ | 347/41 |

(Continued)

FOREIGN PATENT DOCUMENTS

| | | |
|---|---|---|
| JP | 01-130951 | 5/1989 |
| JP | 04-286665 | 10/1992 |

(Continued)

OTHER PUBLICATIONS

Japanese Office Action and English translation dated Jun. 12, 2012 in Japanese Patent Application No. 2006-216573.

(Continued)

*Primary Examiner* — King Poon
*Assistant Examiner* — Ted Barnes
(74) *Attorney, Agent, or Firm* — Fildes & Outland, P.C.

(57) ABSTRACT

A data processing device that processes image data to be supplied to a recording head is provided. The device includes a first storage section configured to store image data for at least a single line; and a processor that reads image data corresponding to each of discharge nozzles of each of discharge groups from the image data of a single line stored in the first storage section and causes the read image data to be stored in a continuous storage region of a second storage section for storing image data to be supplied to the recording head.

28 Claims, 11 Drawing Sheets

(56) References Cited

U.S. PATENT DOCUMENTS

| | | | |
|---|---|---|---|
| 7,364,250 B2* | 4/2008 | Nakajo | 347/14 |
| 7,384,128 B2* | 6/2008 | Sheahan et al. | 347/42 |
| 7,492,481 B2* | 2/2009 | Fujimori | 358/3.12 |
| 7,819,494 B2* | 10/2010 | Sheahan et al. | 347/13 |
| 7,909,422 B2* | 3/2011 | Nakajo | 347/12 |
| 8,016,389 B2* | 9/2011 | Sheahan et al. | 347/57 |
| 2003/0122890 A1* | 7/2003 | Shimada et al. | 347/19 |
| 2004/0165232 A1* | 8/2004 | Chiba et al. | 358/498 |
| 2005/0030327 A1* | 2/2005 | Tatsumi | 347/13 |
| 2005/0275872 A1* | 12/2005 | Otsuki | 358/1.15 |
| 2008/0084446 A1* | 4/2008 | Sheahan et al. | 347/19 |

FOREIGN PATENT DOCUMENTS

| | | |
|---|---|---|
| JP | 9-11455 | 1/1997 |
| JP | 10147010 A * | 6/1998 |
| JP | 11-138798 | 5/1999 |
| JP | 2000-006388 | 1/2000 |
| JP | 2001-030478 | 2/2001 |
| JP | 2001-171118 | 6/2001 |
| JP | 2002-361944 | 12/2002 |
| JP | 2003-118089 | 4/2003 |
| JP | 2004-202698 | 7/2004 |
| JP | 2005-212313 | 8/2005 |
| JP | 2005-271355 | 10/2005 |

OTHER PUBLICATIONS

Abstract and machine translation of JP 2000-006388.
Abstract of JP 11-138798.
Abstract and machine translation of JP 2005-271355.

* cited by examiner

DISCHARGE GROUP

DISCHARGE NOZZLES

PAPER CONVEYANCE DIRECTION

DATA PROCESSING DEVICE, METHOD, STORAGE MEDIUM STORING PROGRAM THEREFOR, AND SIGNAL FOR DISCHARGING LIQUID DROPLETS, AND LIQUID DROPLET DISCHARGING DEVICE

CROSS-REFERENCE TO RELATED APPLICATIONS

This application is based on and claims priority under 35 USC 119 from Japanese Patent Application No. 2006-216573 filed Aug. 9, 2006.

BACKGROUND

1. Technical Field

The present invention relates to a data processing device and method for discharging liquid droplets, a liquid droplet discharge device, a storage medium in which is stored a data processing program for discharging liquid droplets, and a data processing signal for discharging liquid droplets.

2. Related Art

At present, inkjet printers that print on a recording medium by discharging liquid ink droplets from plural discharge nozzles arranged in a recording head have become widespread. Among such inkjet printers, printers that use a recording head where discharge nozzles that discharge liquid droplets are two-dimensionally disposed as shown in FIG. 11A are also known. In the recording head illustrated, plural discharge lines (below, these will be called discharge groups in order to avoid confusion with lines of an image) configured by plural discharge nozzles disposed at predetermined intervals in a main scanning direction are arranged in a sub-scanning direction (paper conveyance direction) in a state where they are slightly offset from each other in the main scanning direction. The inkjet printer can print an image of a single line using these plural discharge groups, whereby the inkjet printer can print an image with high resolution.

Control of from which discharge nozzles the liquid droplets are to be discharged (i.e., on/off of each discharge nozzles) or control of the amount of liquid when liquid droplets are to be discharged is performed on the basis of image data (bitmap data). In this case, when the discharge nozzles of the recording head are two-dimensionally arranged as shown in FIG. 11A, it is necessary to extract and sort the image data to be used in accordance with the positions of the discharge nozzles from a storage section in which the image data are stored.

As shown in FIG. 11B, the image data are sequentially stored in the storage section for each pixel configuring an image. The image data corresponding to the positions of the discharge nozzles are read from here in order to discharge ink droplets. In FIG. 11B, the portions indicated by halftone dots represent image data corresponding to positions in the sub-scanning direction of the discharge groups, and the black dot portions represent image data corresponding to the discharge nozzles of each of the discharge groups. In this manner, because the storage regions storing the image data corresponding to the discharge nozzles of each of the discharge groups are not continuous (sequential), it is necessary to access each individual storage region in accordance with the discharge nozzles and read the image data.

In this manner, accessing the discontinuous storage regions causes an increase in the number of times the storage section is accessed (in the example of FIG. 11B, 64 times). Further, even if the image data of the continuous storage regions are read all at once from the storage section, virtually all of the read data are not used at the time of reading because image data corresponding to each of the discharge nozzles of the same discharge group are not stored in a continuous (sequential) address region.

SUMMARY

According to a first aspect of the invention, there is provided a data processing device that processes image data to be supplied to a recording head, the recording head including plural discharge groups, with each of the discharge groups including plural discharge nozzles that discharge liquid droplets and are arranged in a predetermined direction, the plural the discharge groups being arranged in a direction substantially orthogonal to the predetermined direction such that the discharge groups are offset from each other in the predetermined direction, and the recording head being configured to discharge liquid droplets based on image data for a single line using the plural discharge groups, the data processing device including: a first storage section configured to store image data for at least a single line; and a processor that reads image data corresponding to each of the discharge nozzles of each of the discharge groups from the image data of a single line stored in the first storage section and causes the read image data to be stored in a continuous storage region of a second storage section for storing image data to be supplied to the recording head.

BRIEF DESCRIPTION OF THE DRAWINGS

An exemplary embodiment of the present invention will be described in detail based on the following figures, wherein:

FIG. 7 is a diagram showing the arrangement of bitmap image data before being processed by the data sorting processor;

FIG. 9A is a diagram showing a state where image data are stored in the discharge data memory, and FIG. 9B is a diagram showing a state when the image data are read as continuous data for each discharge group from the discharge data memory and stored in buffers in drive IC units;

DETAILED DESCRIPTION

Figure 1:
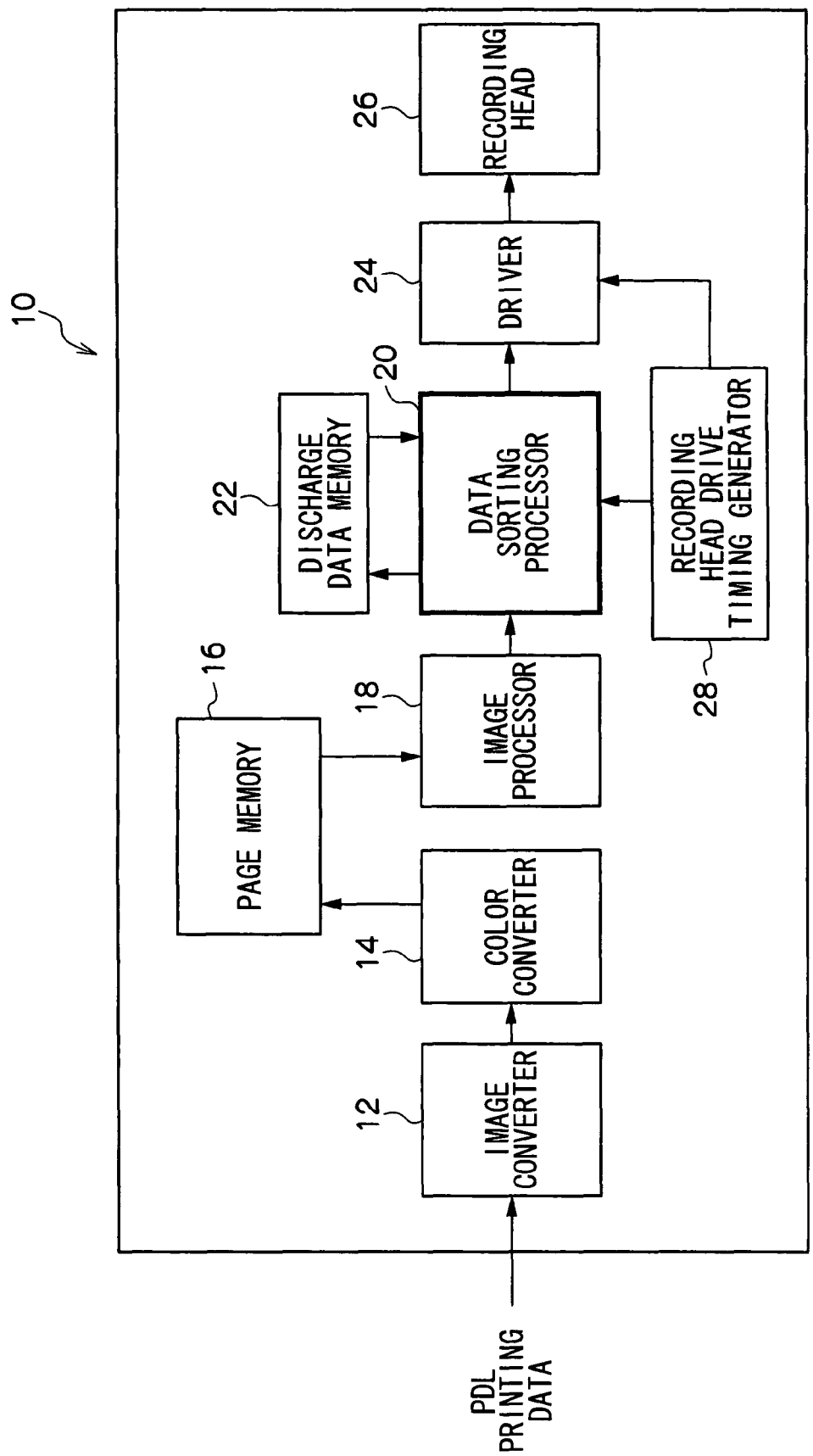
FIG. 1 is a block diagram showing the configuration of a liquid droplet discharge device pertaining to the exemplary embodiment.

FIG. 1 is a block diagram showing the configuration of a liquid droplet discharge device 10 pertaining to an exemplary embodiment of the present invention.

The liquid droplet discharge device 10 is an device that discharges liquid droplets (in the present exemplary embodiment, ink droplets that are color material) onto a recording medium such as paper and includes an image converter 12, a color converter 14, a page memory 16, an image processor 18, a data sorting processor 20, a discharge data memory 22, a driver 24, a recording head 26, and a recording head drive timing generator 28. It will be noted that illustration of a conveyance system that conveys the paper is omitted in FIG. 1.

The image converter 12 analyzes printing data and performs raster image conversion when printing data (e.g., Page Description Language (PDL) data) are inputted thereto from an external computer or the like. Thus, the printing data are converted to a bitmap image.

The color converter 14 converts the color space (e.g., conversion from image data of a RGB color space to image data of an YMCK color space) of the bitmap image converted by the image converter 12 and performs γ-correction with respect to the image data.

The page memory 16 is configured by a storage device such as a hard disk drive (HDD), for example, and primarily stores the image data processed by the color converter 14.

The image processor 18 reads the image data from the page memory 16 to perform known screening such as dithering and converts the image data to image data of a low gradation—such as binarized or tertiarized—capable of being recorded by the recording head 26.

The data sorting processor 20 sorts the image data converted to a low gradation by the image processor 18 and stores the image data in the discharge data memory 22. The data sorting processor 20 can be disposed as an application-specific integrated circuit (ASIC), for example. A memory that stores a program for performing processing for sorting the image data and causing the image data to be stored in the discharge data memory 22, a processor that executes this program, a later-described line buffer 31, and buffers 38 in drive IC units may be installed on the ASIC.

Here, an example is described where a program is stored in the memory of an ASIC and the processor of the ASIC executes that program, but the configuration of storage medium is not limited to this. The storage medium that stores the program executed by the data sorting processor 20 may also be a memory such as a ROM, a CD-ROM, a DVD, a magneto-optical disk, an IC card, a hard disk, or a transmission medium such as carrier waves on a telecommunication line. Further, the program stored in these storage media may also be executed by a CPU installed in an apparatus. Further, any of the processors of the exemplary embodiment may also be installed as a logic circuit of the ASIC.

The discharge data memory 22 in which the image data are stored by the data sorting processor 20 is not particularly limited as long as it is a storage section for storing the image data to be supplied to the later-described driver 24. For example, the discharge data memory 22 may be configured by a dynamic random access memory (DRAM).

The driver 24 includes drive ICs 25 (see FIG. 3) corresponding to each of the discharge nozzles in the recording head 26. The driver 24 drives the recording head 26 on the basis of the image data read from the discharge data memory 22 and outputted via the data sorting processor 20, and causes ink droplets to be discharged from the discharge nozzles in the recording head 26.

The recording head 26 is driven by the driver 24 to discharge ink droplets from the discharge nozzles and form an image on the recording medium. The mechanism by which the ink droplets are discharged is not particularly limited. The recording head 26 is an elongate head having a width substantially equal to the width of the paper, so that the liquid droplet discharge device 10 of the present exemplary embodiment can record an image on the paper by conveying just the paper and without scanning the recording head 26.

Figure 2:
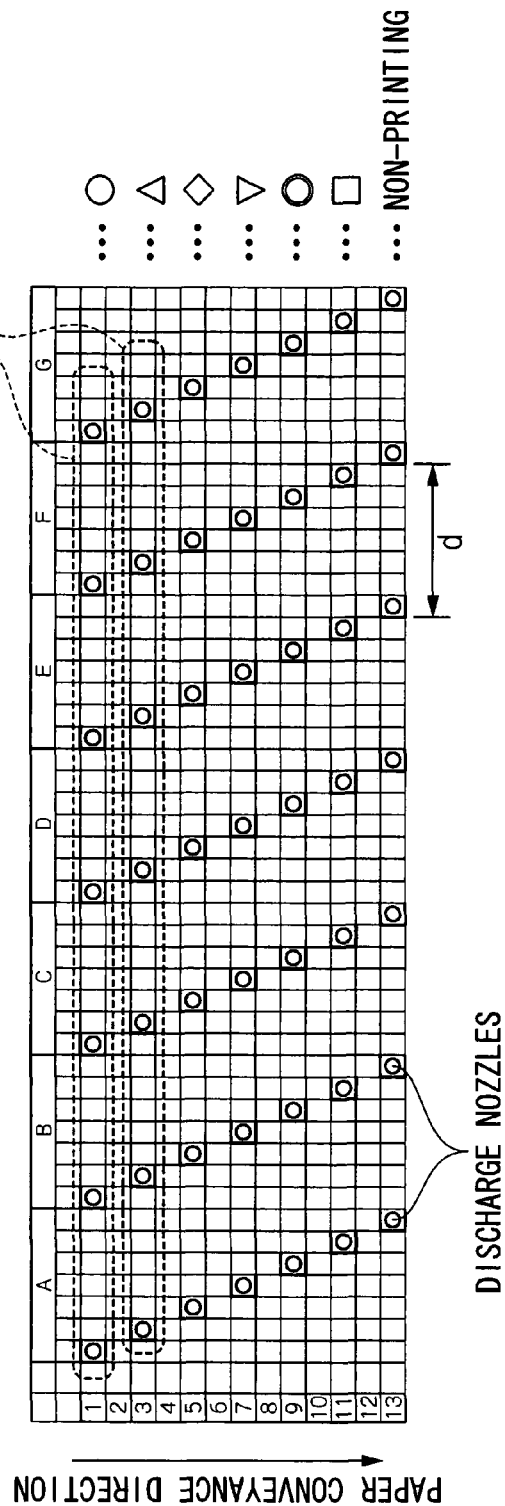
FIG. 2A is a diagram showing the arrangement of discharge nozzles in a recording head.
FIG. 2B is a diagram showing symbols for distinguishing between image data corresponding to each of discharge groups configured by the plural discharge nozzles.

FIG. 2A is a diagram showing the arrangement of the discharge nozzles in the recording head 26. As shown in FIG. 2A, the plural discharge groups (in the present exemplary embodiment, seven), each of which includes plural discharge nozzles (in the present exemplary embodiment, seven) that discharge liquid droplets and are arranged in a direction (below, called "the main scanning direction") substantially orthogonal to the paper conveyance direction, are arranged at predetermined intervals in the paper conveyance direction (below, sometimes called "the sub-scanning direction") in a state where the discharge groups are slightly offset from each other in the main scanning direction. It will be noted that one square shown in FIG. 2A will be described as one pixel below.

In the present exemplary embodiment, the discharge nozzles are disposed a predetermined distance d (here, corresponding to seven pixels) apart from each other in a single discharge group, and the discharge groups are disposed in the sub-scanning direction in a state where they are offset from each other by d/7 (here, one pixel) in the main scanning direction. Further, as shown in FIG. 2A, in the present exemplary embodiment, the discharge groups are disposed in the sub-scanning direction at intervals of a single pixel. The recording head 26 is a recording head capable of recording an image of a single line using the seven discharge groups including the discharge nozzles arranged in this manner.

In the present exemplary embodiment, the number of discharge nozzles in each discharge group is seven in order to simplify description. However, the number of discharge nozzles is not limited to this, and the present invention is also applicable to a head having discharge groups including seven or less or eight or more discharge nozzles. Further, the number of discharge groups is also not limited to seven.

In the present exemplary embodiment, the discharge groups will be distinguished between and called—in order from upstream to downstream in the paper conveyance direction—a first discharge group, a second discharge group, a third discharge group, a fourth discharge group, a fifth discharge group, a sixth discharge group, and a seventh discharge group. Further, pixel data corresponding to the first to seventh groups will be distinguished between and shown using symbols shown in FIG. 2B.

The recording head drive timing generator 28 generates a clock signal and outputs the clock signal to the data sorting processor 20 and the driver 24. The data sorting processor 20 and the driver 24 are actuated in response to the clock signal to cause the ink droplets to be discharged from the recording head 26 at a preferred timing with respect to the paper conveyance speed.

Figure 3:
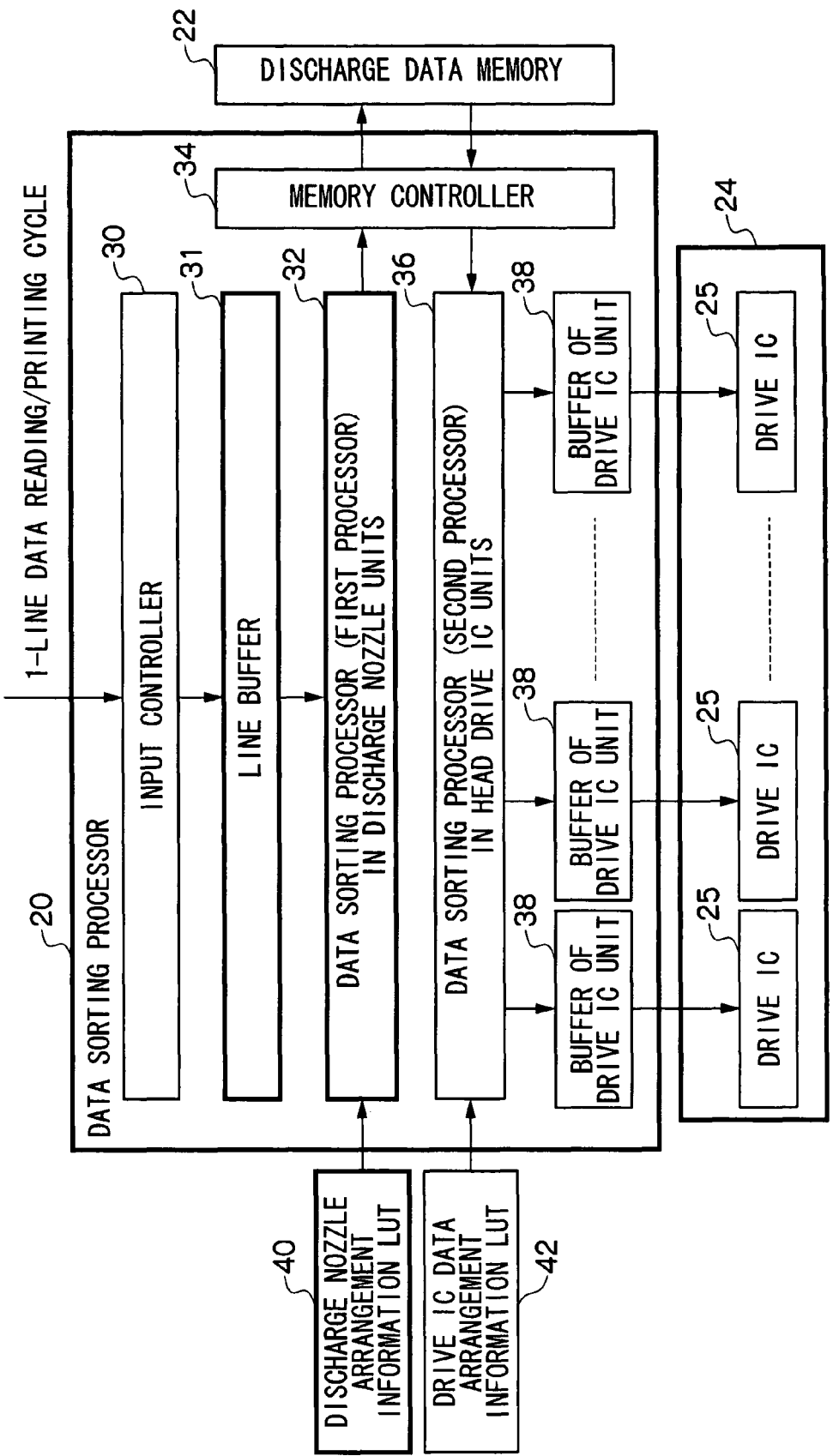
FIG. 3 is a block diagram showing the configurations of a data sorting processor and a driver.

FIG. 3 is a block diagram showing the configurations of the data sorting processor 20 and the driver 24. As shown in FIG. 3, the data sorting processor 20 includes an input controller 30, a line buffer 31, a data sorting processor (below, first processor) 32 in discharge nozzle lineup units, a memory controller 34, a data sorting processor (below, second processor) 36 in head drive IC units, and plural buffers 38 corresponding to each of the discharge nozzles in the recording head 26 (i.e., a buffer 38 is disposed for each head drive IC).

The input controller 30 stores, in the line buffer 31, image data of a single line within one printing cycle via the image processor 18 from the page memory 16.

The line buffer 31 is a buffer capable of being randomly accessed and has a capacity that can store image data of at least a single line. Consequently, the line buffer 31 may be a buffer having a capacity that can store image data of just a single line or may be a buffer having an even larger capacity.

The first processor 32 reads the image data on the basis of arrangement information stored in a discharge nozzle arrangement information look-up table (LUT) 40 from the image data of a single line stored in the line buffer 31 and causes the read image data to be stored in the discharge data memory 22 via the memory controller 34. The discharge nozzle arrangement information LUT 40 is a table in which arrangement information relating to the main-scanning-direction arrangement positions of the discharge nozzles in the recording head 26 is stored for each of the discharge groups.

The memory controller 34 controls reading and writing with respect to the discharge data memory 22.

The second processor 36 reads, from the image data stored in the discharge data memory 22, image data via the memory controller 34 on the basis of arrangement information stored in a drive IC data arrangement information LUT 42, and causes the read image data to be stored in the buffers 38 in drive IC units. The drive IC data arrangement information LUT 42 is, for example, a table in which is stored arrangement information relating to the sub-scanning-direction arrangement positions of the discharge groups of the recording head 26.

Further, the driver 24 includes drive ICs 25 corresponding to each of the discharge nozzles in the recording head 26. The drive ICs 25 control the discharge of the ink droplets from the corresponding discharge nozzles in the recording head 26 on the basis of the image data outputted from the buffers 38.

Operation of the data sorting processor 20 during printing in the present exemplary embodiment will be described below.

Figure 4:
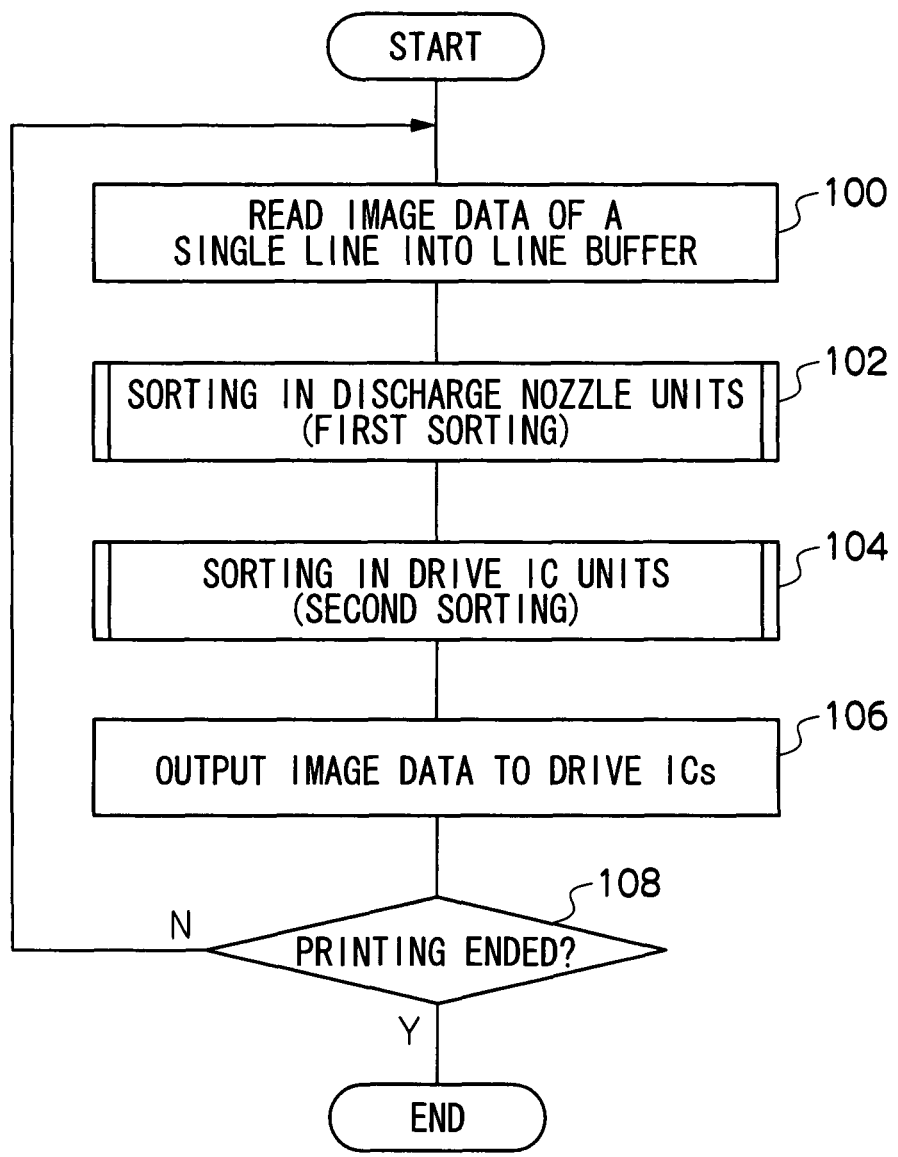
FIG. 4 is a flowchart showing the flow of a main routine executed by the data sorting processor during printing.
Figure 5:
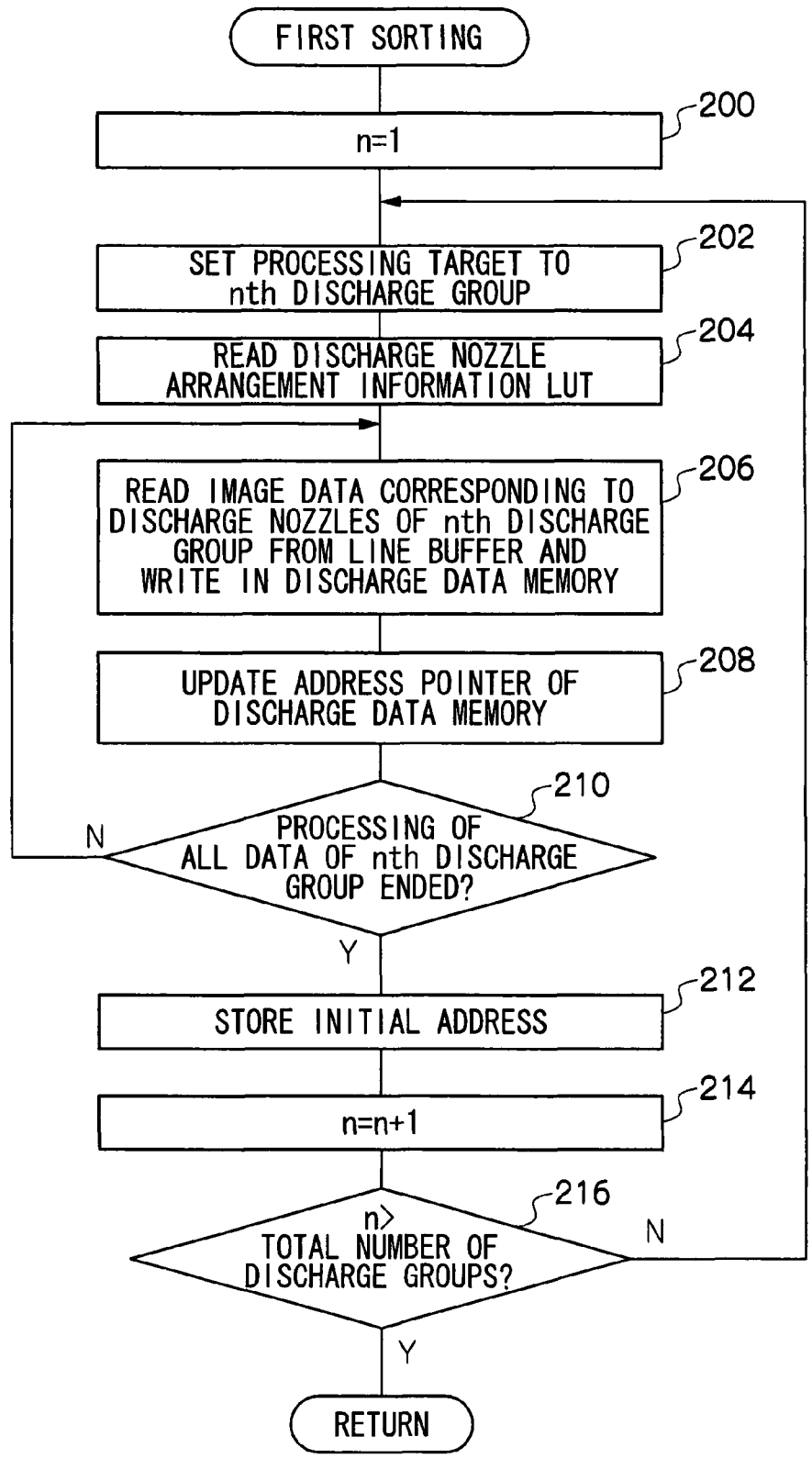
FIG. 5 is a flowchart showing the flow of a first sorting sub-routine.
Figure 6:
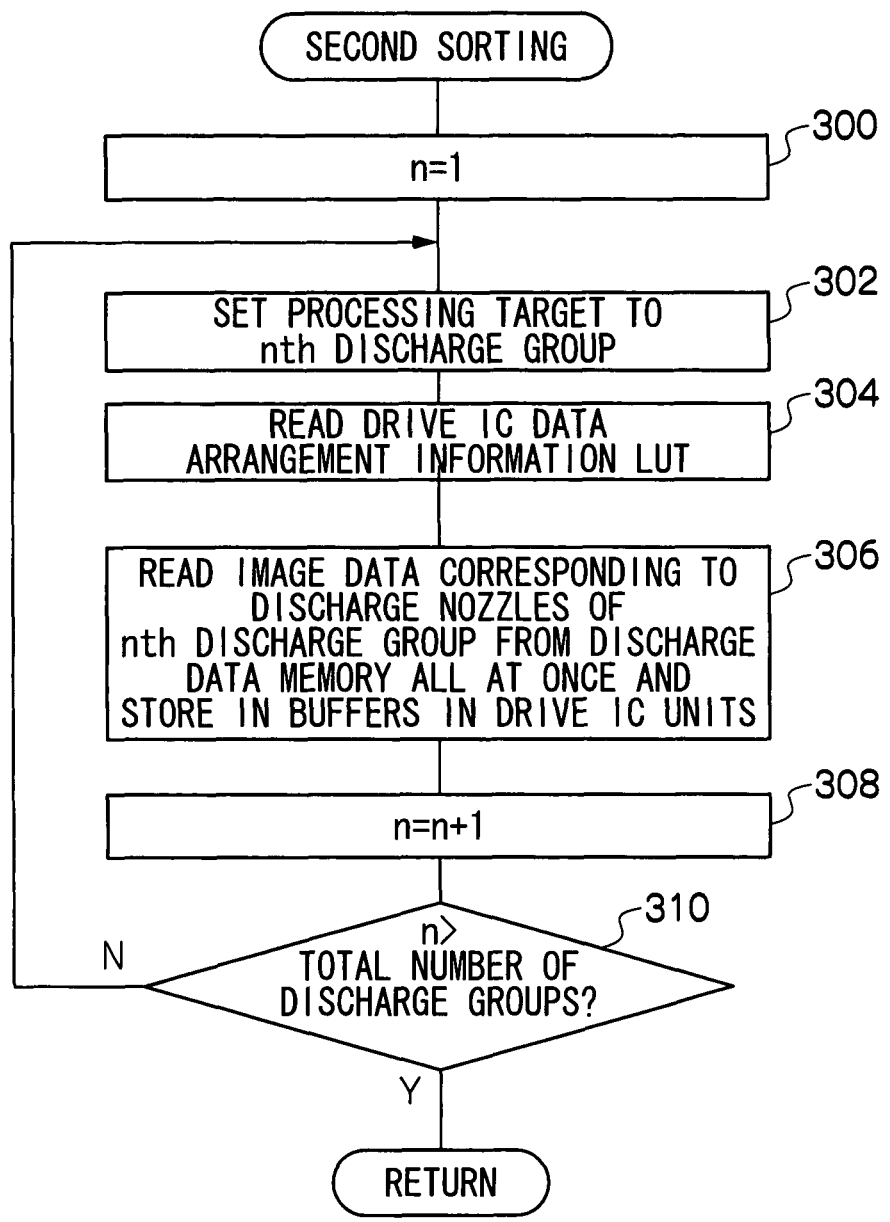
FIG. 6 is a flowchart showing the flow of a second sorting sub-routine.

FIG. 4 is a flowchart showing the flow of a main routine executed by the data sorting processor 20 during printing. Further, FIG. 5 and FIG. 6 are flowcharts showing the flows of sub-routines called up by the main routine.

Turning first to the main routine of FIG. 4, in step 100, a single line of a bitmap image whose gradation has been lowered by the image processor 18 is read into the line buffer 31.

Figure 7:
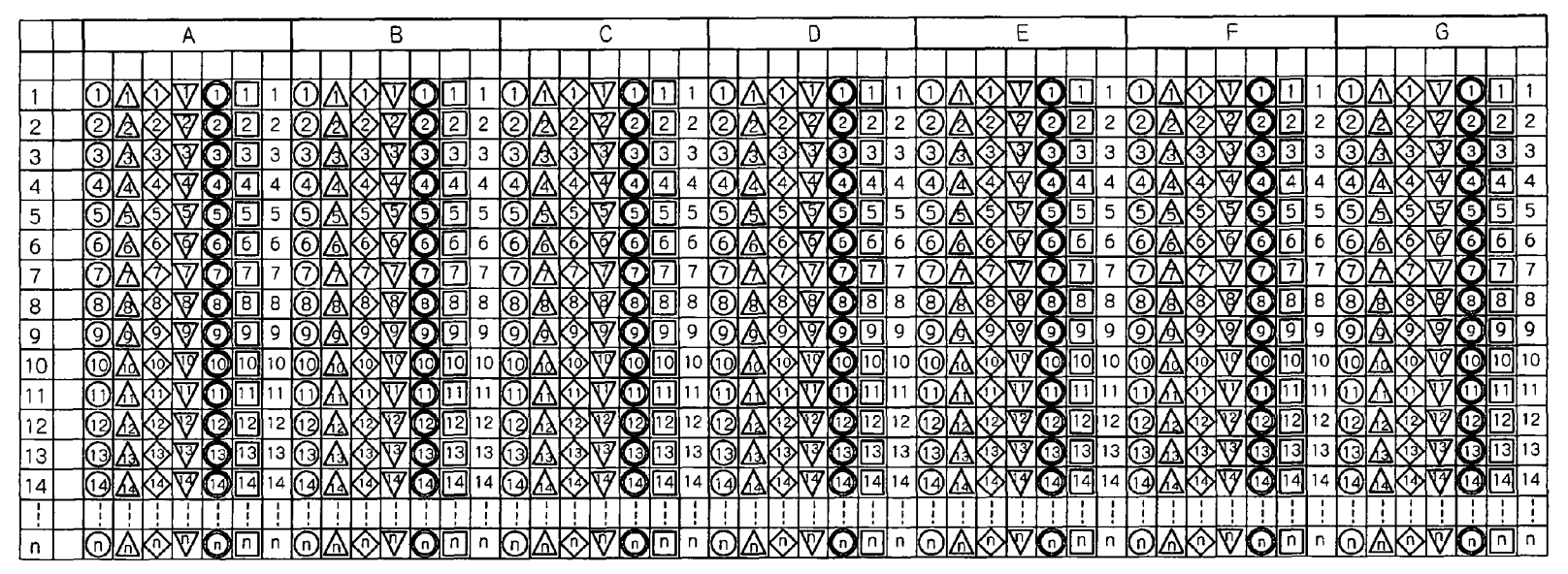

FIG. 7 is a diagram showing the arrangement of bitmap image data before being processed by the data sorting processor 20. As shown in FIG. 7, image data of each of the discharge groups are arranged in an order corresponding to pixel positions, and image data of the same discharge group appear every seven pixels in the main scanning direction. When the image data are stored in the discharge data memory 22 in this arrangement, then the image data corresponding to each of the discharge nozzles must be individually read in the order corresponding to the arrangement of each of the discharge groups when the image data are to be supplied to the driver 24, so the number of times reading is performed with respect to the discharge data memory 22 increases. Thus, in the present exemplary embodiment, sorting in discharge nozzle units is carried out and control is performed such that the image data are stored in continuous storage regions of the discharge data memory 22 for each discharge group.

Figures 8A, 8B, 8C:
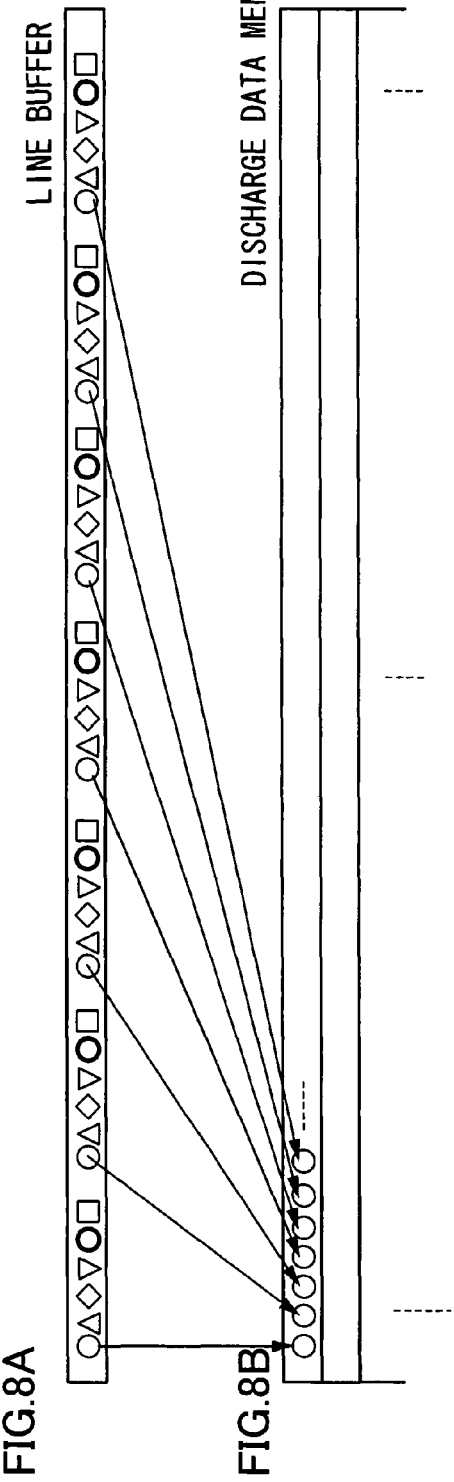
FIG. 8A is a diagram showing a state where image data of a single line are stored in a line buffer.
FIG. 8B is a diagram showing a state where the image data read from the line buffer are stored in a discharge data memory.
FIG. 8C is a diagram showing a state where, in regard to each line of the image data, the image data are stored in continuous storage regions for each discharge group.

In step 100, the image data are read into the line buffer 31 in the arrangement shown in FIG. 7. For that reason, in the present exemplary embodiment, as shown in FIG. 8A, the image data are stored in the line buffer 31 in an arrangement order where image data of the same discharge group appear every seven pixels in the main scanning direction.

In step 102, a sorting (first sorting) sub-routine in discharge nozzle units is executed. FIG. 5 is a flowchart showing the flow of the first sorting sub-routine.

In the first sorting, as shown in FIG. 5, first, in step 200, "1" is set in a counter n. The counter n is a counter for setting the discharge group that is the processing target.

In step 202, the processing target discharge group that is to be sorted by the first sorting is set to the $n^{th}$ discharge group.

In step 204, arrangement information relating to the main-scanning-direction arrangement positions of the discharge nozzles in the recording head 26 is acquired in regard to the $n^{th}$ discharge group from the discharge nozzle arrangement information LUT 40.

In step 206, image data of a single pixel corresponding to the discharge nozzles in the $n^{th}$ discharge group are selected and read from the line buffer 31 on the basis of the acquired arrangement information, and the read image data are written via the memory controller 34 in a storage region instructed by the current address pointer of the discharge data memory 22.

In step 208, the address pointer of the discharge data memory 22 is updated. Here, the address pointer is updated such that a storage region continuous with the storage region in which the image data have been written in step 206 is instructed.

In step 210, it is determined whether or not processing to write the image data corresponding to all of the discharge nozzles in the $n^{th}$ discharge group has ended. When it is determined that processing has not ended, then the sub-routine returns to step 206 and the above-described processing is repeated.

In step 212, information of the initial address of the storage region in which have been written the image data corresponding to all of the discharge nozzles in the $n^{th}$ discharge group in the discharge data memory 22 is stored in an unillustrated storage region such as a register. The information of the initial address is stored per line of image data and per discharge group.

In step 214, n is incremented by 1.

In step 216, it is determined whether or not n exceeds the total number of discharge groups. Because there are seven discharge groups in the present exemplary embodiment, the determination is affirmative (YES) when n exceeds 7 and negative (NO) when n is equal to or less than 7.

When the determination is NO in step 216, then the sub-routine returns to step 202 and the above-described processing is repeated using the next discharge group as the processing target.

By repeating steps 206 to 210, the image data corresponding to each of the discharge nozzles in the same discharge group are continuously read from the line buffer 31 as shown in FIG. 8A, and the read image data are stored in a continuous storage region of the discharge data memory 22 as shown in FIG. 8B. By performing this processing in regard to each line of image data, the image data are stored in continuous storage regions for each discharge group in regard to each line of image data as shown in FIG. 8C.

After the end of the first sorting sub-routine, the sorting (second sorting) sub-routine in drive IC units is executed in step 104 of FIG. 4. FIG. 6 is a flowchart showing the flow of the second sorting sub-routine.

In the second sorting, first, in step 300, "1" is set in the counter n. The counter n is a counter for setting the discharge group that is the processing target.

In step 302, the processing target discharge group that is to be sorted by the second sorting is set to the $n^{th}$ discharge group.

In step 304, arrangement information relating to the sub-scanning-direction arrangement positions is acquired in regard to the $n^{th}$ discharge group from the drive IC data arrangement information LUT 42.

In step 306, image data corresponding to all of the discharge nozzles in the $n^{th}$ discharge group is read as continuous data from the discharge data memory 22 on the basis of the acquired arrangement information.

As mentioned previously, in the case of the present exemplary embodiment, the first to seventh discharge groups are disposed at intervals of a single pixel in the sub-scanning direction. Consequently, it is necessary to record image data for every other line at the same timing between discharge groups that are adjacent in the sub-scanning direction. For example, when image data of the first line are to be recorded by the first discharge group, image data of the third line must be recorded by the second discharge group, image data of the fifth line must be recorded by the third discharge group, and image data must thereafter be similarly recorded per line by the fourth to seventh discharge groups.

The arrangement information acquired from the drive IC data arrangement information LUT 42 is arrangement information representing the sub-scanning-direction arrangement of each of these discharge groups. Thus, which line of image data must be recorded can be understood.

Further, the necessary image data can be directly read from the discharge data memory 22 on the basis of the information of the initial address stored in step 212 of the first sorting. Further, image data corresponding to the discharge nozzles in the same discharge group are stored in a continuous region of the discharge data memory 22 by the first sorting. For that reason, in the present exemplary embodiment, image data of seven pixels can be read as continuous data—that is, as a single block of data—starting from the initial address that has been stored. Thus, when the discharge data memory 22 is a DRAM, for example, high-speed access by burst transfer also becomes possible.

Therefore, in next step 306, the image data to be recorded by the processing target discharge group are determined on the basis of the acquired arrangement information, the initial address representing the storage region in which are stored that image data is accessed, and all of the image data to be recorded by the processing target discharge group are read as continuous data.

Then, in step 306, the read image data are written into the buffers 38 corresponding to the drive ICs for driving the corresponding discharge nozzles.

In step 308, n is incremented by 1.

In step 310, it is determined whether or not n exceeds the total number of discharge groups. Because there are seven discharge groups in the present exemplary embodiment, the determination is YES when n exceeds 7 and NO when n is equal to or less than 7.

Figures 9A, 9B:
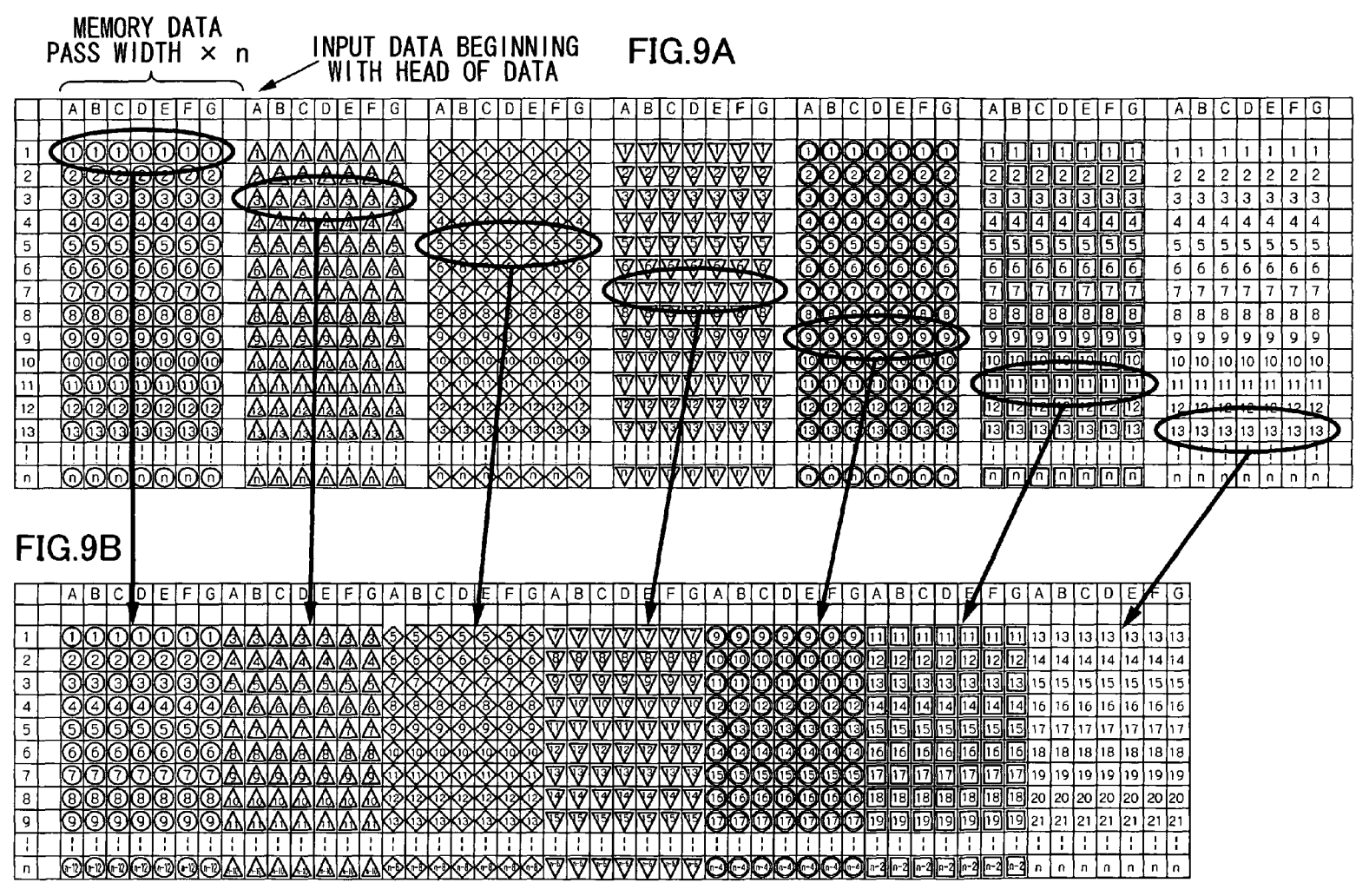

When the determination is NO in step 310, then the subroutine returns to step 302 and the above-described processing is repeated using the next discharge group as the processing target. Due to this processing, as shown in FIG. 9A, the recording target image data of each discharge group are read as a single block of continuous data from the discharge data memory 22. Next, as shown in FIG. 9B, the image data to be recorded at the same timing by each discharge group are written into the buffers 38 in drive IC units.

After the end of the second sorting sub-routine, in step 106 of FIG. 4, the image data stored in the buffers 38 are outputted at the same timing to each of the drive ICs 25 of the driver 24 in synch with the clock signal inputted from the recording head drive timing generator 28.

In step 108, it is determined whether or not printing has ended. Here, when it is determined that printing has not ended, then the main routine returns to step 100 and the above-described processing is repeated in regard to the next line of image data. When it is determined that printing has ended, then the main routine ends.

As is apparent from FIG. 2 to FIG. 9, because the discharge nozzles in the recording head 26 are two-dimensionally arranged as mentioned previously, image data for at least the sub-scanning-direction width (in the present exemplary embodiment, thirteen lines) of the recording head 26 become necessary for printing. Consequently, at the start of printing, it is necessary for image data of at least thirteen lines to be stored in the discharge data memory 22.

Thus, when printing is started, it is preferable for step 100 and step 102 of the main routine of FIG. 4 to be continuously executed in correspondence to the number of lines equal to the sub-scanning-direction width of the recording head 26 and for image data of that number of lines to be stored in the discharge data memory 22. Then, after printing starts, it suffices for the image data to be processed in the order of the main routine of FIG. 4 in order to be ready for printing by processing image data of a single line within one printing cycle.

Further, because of this, it suffices for the discharge data memory 22 to have a capacity that can store image data of at least the sub-scanning-direction width of the recording head 26.

It will be noted that, although an example was described in the preceding exemplary embodiment where there was just one line buffer 31, the present invention is not limited to this and may also include plural line buffers 31.

Figure 10:
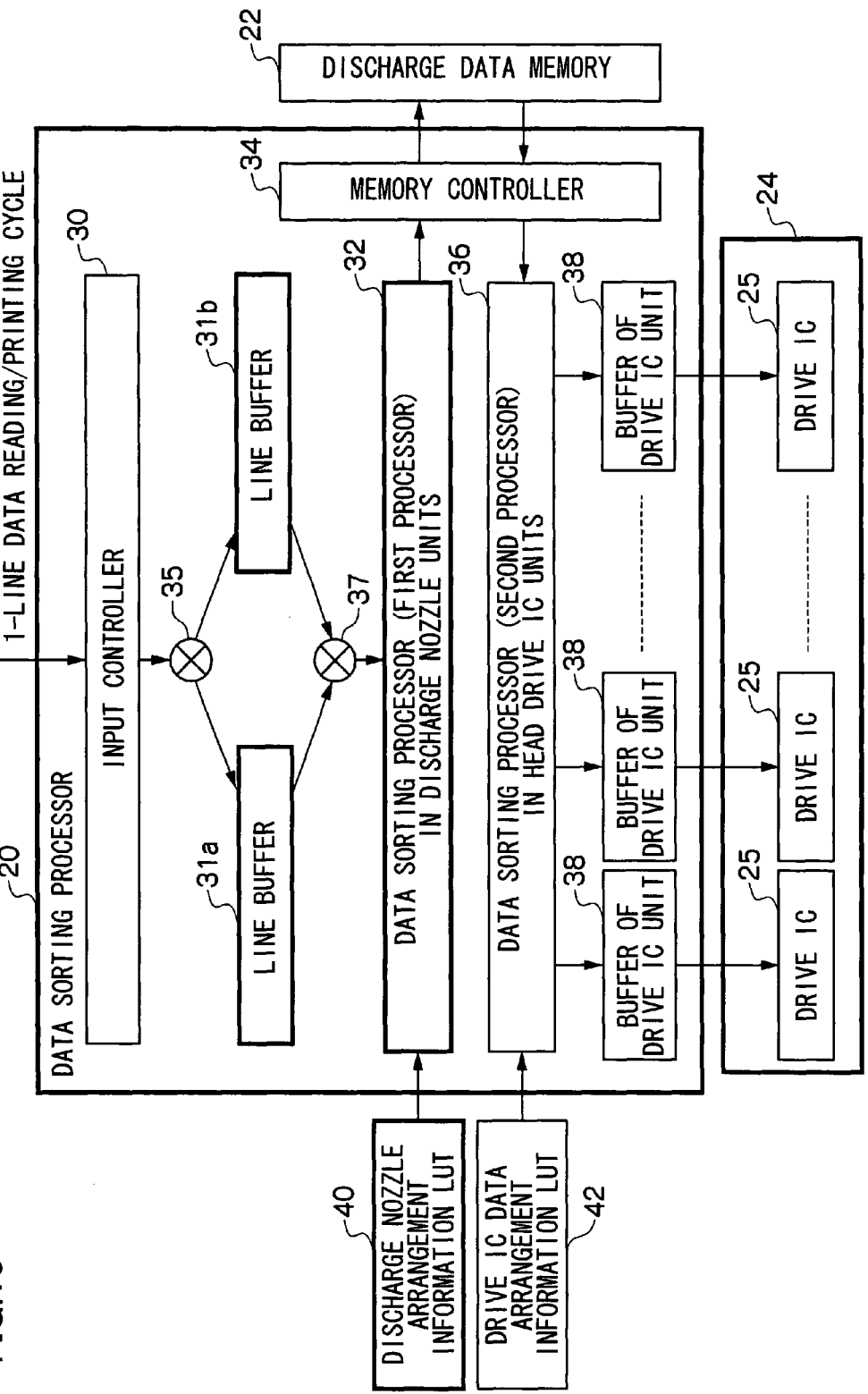
FIG. 10 is a diagram showing a modification of the data sorting processor.
Figure 11A:
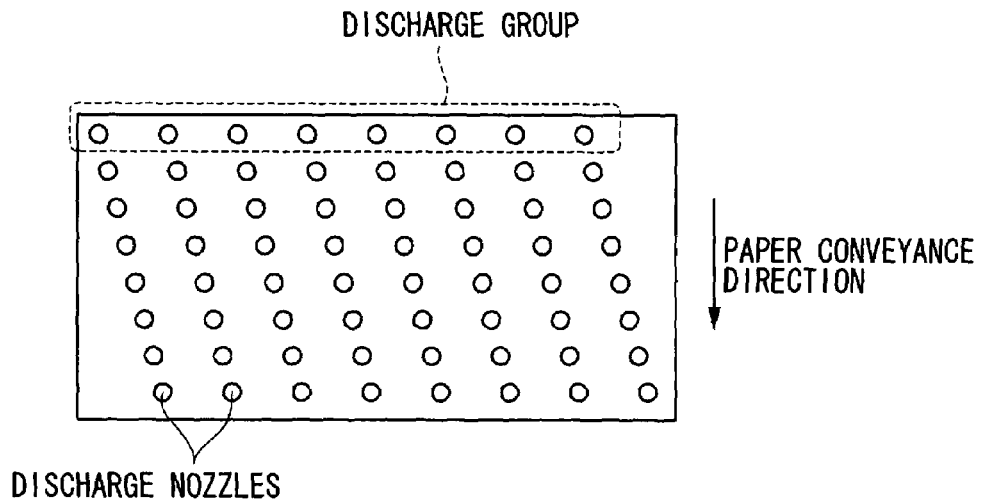
FIG. 11A is a diagram showing an example of a recording head where discharge nozzles are two-dimensionally arranged.
Figure 11B:
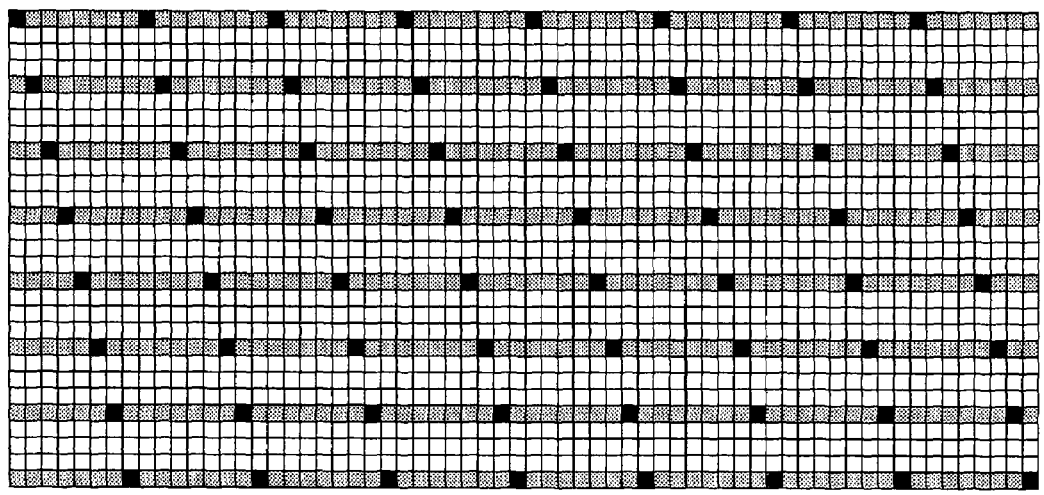
FIG. 11B is a diagram describing a conventional reading method with respect to image data stored in a storage section.

For example, as shown in FIG. 10, two line buffers 31a and 31b may be disposed, and the storage destinations of image data of single lines inputted via the input controller 30 may be alternately switched by a selector 35. Moreover, the line buffer from which image data are to be read by the first sorting processor 32 may be switched to either one of the line buffer 31a or the line buffer 31b by a selector 37. In this case, image data of the next single line are stored in one line buffer while image data stored in the other line buffer are being processed by the first processor 32. Processing other than that is the same as in the preceding exemplary embodiment.

It will also be noted that, in the preceding exemplary embodiment, the first sorting and the second sorting may be serially executed or executed in parallel by configuring a circuit so as to be capable of parallel operation.

The foregoing description of the exemplary embodiment of the present invention has been provided for the purpose of illustration and description. It is not intended to be exhaustive or to limit the invention to the precise form disclosed herein. Obviously, many modifications and variations will be apparent to a practitioner skilled in the art. The exemplary embodiments were chosen and described in order to best explain the principles of the invention and its practical applications, thereby enabling others skilled in the art to understand the invention according to various embodiments and with various modifications as are suited to the particular use contemplated. It is intended that the scope of the invention be defined by the following claims and their equivalents.

What is claimed is:

1. A data processing device that processes image data to be supplied to a recording head, the recording head comprising a plurality of discharge groups, with each of the discharge groups including a plurality of discharge nozzles that discharge liquid droplets and are arranged in a predetermined direction, the plurality of the discharge groups being arranged in a direction orthogonal to the predetermined direction such that the discharge groups are offset from each other in the predetermined direction, and the recording head being configured to discharge liquid droplets based on image data using the plurality of discharge groups, the data processing device comprising:
   a first storage section configured to store image data for at least a single line, wherein for each single line, the image data for the discharge nozzles of each discharge group are discontinuously stored in non-adjacent addresses; and
   a processor that sequentially reads in order image data corresponding to each of the discharge nozzles of each discharge group from the image data of one said single line of said at least one said single line stored in the first storage section and causes the sequentially read image data for each of the plurality of discharge groups to be stored in a continuous storage region of adjacent addresses of a second storage section corresponding to the print head nozzle grouping for storing the image data to be supplied to the recording head such that the image data corresponding to each of the discharge nozzles in the same discharge group are stored as a single continuous block of data.

2. The data processing device of claim 1, further comprising an arrangement information storage section in which is stored arrangement information of the discharge nozzles of each of the discharge groups,
   wherein the processor reads the image data corresponding to each of the discharge nozzles of each of the discharge groups of the recording head from the image data of one said single line of said at least one said single line stored in the first storage section on the basis of the arrangement information stored in the arrangement information storage section and causes the read image data to be stored in a continuous storage region of adjacent addresses of the second storage section corresponding to the print head nozzle grouping.

3. The data processing device of claim 2, wherein the predetermined direction is a main scanning direction, and the arrangement information storage section stores arrangement information relating to main-scanning-direction arrangement positions of the discharge nozzles.

4. The data processing device of claim 1, further comprising:
   a plurality of the first storage sections, and
   a selector that selects one first storage section from among the plurality of the first storage sections,
   wherein the processor reads image data corresponding to each of the discharge nozzles of each of the discharge groups from the image data for one said single line of said at least one said single line stored in the first storage section selected by the selector and causes the read image to be stored in a continuous storage region of adjacent addresses of the second storage section corresponding to the print head nozzle grouping.

5. The data processing device of claim 1, wherein the predetermined direction is a main scanning direction, and the direction orthogonal to the predetermined direction is a sub-scanning direction.

6. The data processing device of claim 1, wherein the processor stores, in advance, second arrangement information of the discharge nozzles of each of the discharge groups, and the processor reads, as single blocks of continuous data, image data corresponding to each of the discharge nozzles of each discharge group from the second storage section and supplying the read single blocks of continuous data to the recording head.

7. The data processing device of claim 6, wherein the direction orthogonal to the predetermined direction is a sub-scanning direction, and the second arrangement information is arrangement information relating to sub-scanning-direction arrangement positions of the discharge nozzles.

8. A liquid droplet discharge device comprising:
   a recording head comprising a plurality of discharge groups, with each of the discharge groups including a plurality of discharge nozzles that discharge liquid droplets and are arranged in a predetermined direction, the plurality of discharge groups being arranged in a direction orthogonal to the predetermined direction such that the discharge groups are offset from each other in the predetermined direction, and the recording head being configured to discharge liquid droplets based on image data using the plurality of discharge groups;
   a first storage section configure to store image data for at least a single line, wherein for each single line, the image data for the discharge nozzles of each discharge group are discontinuously stored in non-adjacent addresses;
   a second storage section that stores the image data to be supplied to the recording head; and
   a processor that performs processing that sequentially reads in order image data corresponding to each of the discharge nozzles of each discharge group from the image data of one said single line of said at least one said single line stored in the first storage section and causes the read the sequentially read image data for each of the plurality of discharge groups to be stored in a continuous storage region of adjacent addresses of the second storage section corresponding to the print head nozzle grouping such that the image data corresponding to each of the discharge nozzles in the same discharge group are stored as a single continuous block of data.

9. The liquid droplet discharge device of claim 8, further comprising an arrangement information storage section in which is stored arrangement information of the discharge nozzles of each of the discharge groups,
   wherein the processor reads image data corresponding to each of the discharge nozzles of each of the discharge groups from the image data for one said single line of said at least one said single line stored in the first storage section on the basis of the arrangement information stored in the arrangement information storage section and causes the read image data to be stored in a continuous storage region of adjacent addresses of the second storage section corresponding to the print head nozzle grouping.

10. The liquid droplet discharge device of claim 9, wherein the predetermined direction is a main scanning direction, and the arrangement information storage section stores arrangement information relating to main-scanning-direction arrangement positions of the discharge nozzles.

11. The liquid droplet discharge device of claim 8 further comprising:
   a plurality of the first storage sections, and
   a selector that selects one first storage section from among the plurality of the first storage sections, wherein the processor reads image data corresponding to each of the discharge nozzles of each of the discharge groups from the image data for one said single line of said at least one said single line stored in the first storage section selected by the selector and causes the read image to be stored in a continuous storage region of adjacent addresses of the second storage section corresponding to the print head nozzle grouping.

12. The liquid droplet discharge device of claim 8, wherein the predetermined direction is a main scanning direction, and the direction orthogonal to the predetermined direction is a sub-scanning direction.

13. The liquid droplet discharge device of claim 8, wherein the processor stores, in advance, second arrangement information of the discharge nozzles of each of the discharge groups, and the processor reads, as single blocks of continuous data, image data corresponding to each of the discharge nozzles of each discharge group from the second storage section and supplying the read single blocks of continuous data to the recording head.

14. The liquid droplet discharge device of claim 13, wherein the direction orthogonal to the predetermined direction is a sub-scanning direction, and the second arrangement information is arrangement information relating to sub-scanning-direction arrangement positions of the discharge nozzles.

15. A non-transitory computer readable medium that stores a program causing a computer to execute data processing that processes image data to be supplied to a recording head, the recording head comprising a plurality of discharge groups, with each of the discharge groups including a plurality of discharge nozzles that discharge liquid droplets and are arranged in a predetermined direction, the plurality of discharge groups being arranged in a direction orthogonal to the predetermined direction such that the discharge groups are offset from each other in the predetermined direction, and the recording head being configured to discharge liquid droplets based on image data using the plurality of discharge groups, the data processing comprising:

causing image data for a single line to be stored in a first storage section configured to store image data for at least a single line, wherein for each single line, the image data for the discharge nozzles of each discharge group are discontinuously stored in non-adjacent addresses; and sequentially reading in order image data corresponding to each of the discharge nozzles of each discharge group from the image data for one said single line of said at least one said single line stored in the first storage section and causing the sequentially read image data for each of the plurality of discharge groups to be stored in a continuous storage region of adjacent addresses of a second storage section corresponding to the print head nozzle grouping for storing the image data to be supplied to the recording head such that the image data corresponding to each of the discharge nozzles in the same discharge group are stored as a single continuous block of data.

16. The non-transitory computer readable medium of claim 15, wherein the data processing further comprises storing, in advance, arrangement information of the discharge nozzles of each of the discharge groups, and reading image data corresponding to each of the discharge nozzles of each of the discharge groups from the image data for one said single line of said at least one said single line stored in the first storage section on the basis of the stored arrangement information and causing the read image data to be stored in a continuous storage region of adjacent addresses of the second storage section corresponding to the print head nozzle grouping.

17. The non-transitory computer readable medium of claim 16, wherein the predetermined direction is a main scanning direction, and the arrangement information is arrangement information relating to main-scanning-direction arrangement positions of the discharge nozzles.

18. The non-transitory computer readable medium of claim 15, wherein the predetermined direction is a main scanning direction, and the direction orthogonal to the predetermined direction is a sub-scanning direction.

19. The non-transitory computer readable medium of claim 15, further comprising storing, in advance, second arrangement information of the discharge nozzles of each of the discharge groups, and reading, as single blocks of continuous data, image data corresponding to each of the discharge nozzles of each discharge group from the second storage section and supplying the read single blocks of continuous data to the recording head.

20. The non-transitory computer readable of claim 19, wherein the direction orthogonal to the predetermined direction is a sub-scanning direction, and the second arrangement information is arrangement information relating to sub-scanning-direction arrangement positions of the discharge nozzles.

21. A method of processing image data supplied to a recording head comprising a plurality of discharge groups, with each of the discharge groups including a plurality of discharge nozzles that discharge liquid droplets and are arranged in a predetermined direction, the plurality of discharge groups being arranged in a direction orthogonal to the predetermined direction such that the discharge groups are offset from each other in the predetermined direction, and the recording head being configured to discharge liquid droplets based on image data using the plurality of discharge groups, the data processing method comprising:

causing image data for a single line to be stored in a first storage section configured to store image data for at least a single line, wherein for each single line, the image data for the discharge nozzles of each discharge group are discontinuously stored in non-adjacent addresses; and sequentially reading in order image data corresponding to each of the discharge nozzles of each discharge group from the image data for one said single line of said at least one said single line stored in the first storage section and causing the sequentially read image data for each of the plurality of discharge groups to be stored in a continuous storage region of adjacent addresses of a second storage section corresponding to the print head nozzle grouping for supplying the image data to the recording head such that the image data corresponding to each of the discharge nozzles in the same discharge group are stored as a single continuous block of data.

22. The data processing method of claim 21, further comprising storing, in advance, first arrangement information of the discharge nozzles of each of the discharge groups, and reading image data corresponding to each of the discharge nozzles of each of the discharge groups from the image data for one said single line of said at least one said single line stored in the first storage section on the basis of the stored first arrangement information and causing the read image data to be stored in a continuous storage region of adjacent addresses of the second storage section corresponding to the print head nozzle grouping.

23. The data processing method of claim 22, wherein the predetermined direction is a main scanning direction, and the first arrangement information is arrangement information relating to main-scanning-direction arrangement positions of the discharge nozzles.

24. The data processing method of claim 21, wherein the predetermined direction is a main scanning direction, and the direction orthogonal to the predetermined direction is a sub-scanning direction.

25. The data processing method of claim 21, further comprising reading, as single blocks of continuous data, image data corresponding to each of the discharge nozzles of each discharge group from the second storage section and supplying the read single blocks of continuous data to the recording head.

26. The data processing method of claim 25, further comprising storing, in advance, second arrangement information of the discharge nozzles of each of the discharge groups,
  wherein the supplying includes reading, as single blocks of continuous data, image data corresponding to each of the discharge nozzles of each discharge group from the second storage section on the basis of the second arrangement information and supplying the read single blocks of continuous data to the recording head.

27. The data processing method of claim 26, wherein the direction orthogonal to the predetermined direction is a sub-scanning direction, and the second arrangement information is arrangement information relating to sub-scanning-direction arrangement positions of the discharge nozzles.

28. A method for causing a computer to execute data processing that processes image data to be supplied to a recording head, the recording head comprising a plurality of discharge groups, with each of the discharge groups including a plurality of discharge nozzles that discharge liquid droplets and are arranged in a predetermined direction, the plurality of discharge groups being arranged in a direction orthogonal to the predetermined direction such that the discharge groups are offset from each other in the predetermined direction, and the recording head being configured to discharge liquid droplets based on image data using the plurality of discharge groups, the data processing comprising:

causing image data for a single line to be stored in a first storage section configured to storing image data for at least a single line, wherein for each single line, the image data for the discharge nozzles of each discharge group are discontinuously stored in non-adjacent addresses; and sequentially reading in order image data corresponding to each of the discharge nozzles of each discharge group from the image data for one said single line of said at least one said single line stored in the first storage section and causing the sequentially read image data for each of the plurality of discharge groups to be stored in a continuous storage region of adjacent addresses of a second storage section corresponding to the print head nozzle grouping for storing the image data to be supplied to the recording head such that the image data corresponding to each of the discharge nozzles in the same discharge group are stored as a single continuous block of data.

* * * * *